United States Patent
Berzon et al.

(10) Patent No.: US 11,214,026 B2
(45) Date of Patent: *Jan. 4, 2022

(54) STRUCTURED FILM LAMINATE WITH ANTISTATIC COMPOSITIONS EMBEDDED THEREIN

(71) Applicant: ESSILOR INTERNATIONAL, Charenton-le-Pont (FR)

(72) Inventors: Ronald A. Berzon, Dallas, TX (US); Haipeng Zheng, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 142 days.

This patent is subject to a terminal disclaimer.

(21) Appl. No.: 15/781,294

(22) PCT Filed: Dec. 4, 2015

(86) PCT No.: PCT/EP2015/078674
§ 371 (c)(1),
(2) Date: Jun. 4, 2018

(87) PCT Pub. No.: WO2017/092824
PCT Pub. Date: Jun. 8, 2017

(65) Prior Publication Data
US 2018/0354209 A1    Dec. 13, 2018

(51) Int. Cl.
| | | |
|---|---|---|
| *B29D 7/01* | (2006.01) |
| *C08K 3/16* | (2006.01) |
| *C08K 3/22* | (2006.01) |
| *C08L 1/12* | (2006.01) |
| *C08L 29/04* | (2006.01) |
| *G02B 5/30* | (2006.01) |
| *G02B 1/16* | (2015.01) |
| *C08K 3/04* | (2006.01) |

(52) U.S. Cl.
CPC ............... *B29D 7/01* (2013.01); *C08K 3/041* (2017.05); *C08K 3/042* (2017.05); *C08K 3/16* (2013.01); *C08K 3/22* (2013.01); *C08L 1/12* (2013.01); *C08L 29/04* (2013.01); *G02B 1/16* (2015.01); *G02B 5/3033* (2013.01); *C08K 2003/166* (2013.01); *C08K 2201/001* (2013.01); *C08K 2201/005* (2013.01); *C08K 2201/017* (2013.01); *C08L 2201/10* (2013.01); *C08L 2203/16* (2013.01)

(58) Field of Classification Search
None
See application file for complete search history.

(56) References Cited

U.S. PATENT DOCUMENTS

| | | | | |
|---|---|---|---|---|
| 4,800,115 A | * | 1/1989 | Havens | C08K 5/103 428/178 |
| 5,356,468 A | * | 10/1994 | Havens | C09D 101/18 524/37 |
| 5,370,981 A | * | 12/1994 | Krafft | C08G 61/126 430/529 |
| 5,472,833 A | | 12/1995 | Havens et al. | |
| 5,830,983 A | * | 11/1998 | Alex | C08L 71/02 528/322 |
| 2008/0268215 A1 | * | 10/2008 | Hattori | G02B 1/16 428/212 |
| 2010/0253886 A1 | * | 10/2010 | Kim | C09D 133/14 349/96 |

OTHER PUBLICATIONS

International Search Report and Written Opinion issued in International Application No. PCT/EP2015/078674, dated Jul. 28, 2016.
Sh. M. Ebrahim et al., "Electrical and structural properties of polyaniline/cellulose triacetate blend films", Journal of Polymer Research, vol. 14, No. 5, Jul. 21, 2007, pp. 423-429.
Office Action issued in corresponding European Patent Application No. 15 808 369.1 dated Apr. 6, 2020.

* cited by examiner

*Primary Examiner* — Sheeba Ahmed
(74) *Attorney, Agent, or Firm* — Norton Rose Fulbright US LLP

(57) ABSTRACT

Embodiments of the disclosure relate to an antistatic film structure which comprises a transparent antistatic support structure and at least one antistatic component. The transparent antistatic support structure and antistatic component may be combined by imbibing, melt extruding, blown film extruding, calendaring, solvent casting, mold casting, wet transfer, sublimation, and solidification of a liquid to a solid using heat, UV or other means.

19 Claims, No Drawings

STRUCTURED FILM LAMINATE WITH ANTISTATIC COMPOSITIONS EMBEDDED THEREIN

CROSS-REFERENCE TO RELATED APPLICATIONS

This application is a national phase application under 35 U.S.C. § 371 of International Application No. PCT/EP2015/078674 filed 4 Dec. 2015, the entire contents of which is specifically incorporated by reference herein without disclaimer.

FIELD OF THE INVENTION

The invention relates to the field of film laminates, including transparent laminates for display devices and optical articles such as spectacles and sunglasses.

BACKGROUND

During the manufacture of structured film laminates, which are primarily composed of insulating materials, localized static charges may accumulate at the laminate layer surface. These localized static charges are capable of attracting small, lightweight foreign particles such as dust particles. As a result of the electrostatic attraction between foreign particles and the laminate layer surface, the foreign particles cling to and accumulate on the laminate layer surface. As successive layers are added to a structure film laminate during assembly, clinging foreign particles are incorporated between the laminate layers. The integrated foreign particles disperse light passing through the laminate, thereby increasing haze and reducing optical clarity. It is therefore desirable that no foreign particles be attracted to laminate layer surfaces during the assembly of a structured film laminate.

There is a need in the industry for techniques that render existing film laminate layers antistatic. The methods described herein provide several different approaches for embedding antistatic molecules within laminate layer compositions. The laminate layer compositions are commonly used in the manufacture of film laminates. The incorporation of antistatic molecules into existing laminate layer compositions will reduce costs associated with providing new or additional layers into existing film laminate production methods.

Cellulose and derivatives thereof are commonly employed in the production of transparent film laminates. Cellulose is a natural glucose polysaccharide obtained from plant products. Cellulose acetate is a semi-synthetic cellulose derivative that is obtained by acetylation (or esterification) of free glucose hydroxyl groups. Cellulose acetates with different properties are obtained depending on the esterification degree or degree of substitution. Cellulose triacetate includes three acetate esters per glucose monomer, and is currently manufactured by reacting the alcohol groups with acetic anhydride, glacial acetic acid and sulfuric acid catalyst.

The majority of cellulose triacetate is manufactured by a solvent casting process to provide a TAC film. Cellulose polymer films are often supplied with protective liners in order to keep their surface pristine. Upon removal of the liners, static charges can build up, which will attract particles and reduce optical quality. There is a need to minimize static buildup within commonly-used transparent laminate components like cellulose and cellulose derivatives. Antistatic additives may be incorporated during film production to bestow antistatic properties on the film product. Antistatic films may then be incorporated into structured film laminates.

SUMMARY

It is an object of the disclosure to provide a structured film laminate layer with one or more conductive antistatic substances. Incorporation of an antistatic substance into an existing laminate layer prevents or reduces attraction of foreign particles during manufacturing. Furthermore, incorporation of an antistatic substance into an existing laminate layer reduces the overall thickness and weight of the resulting laminate.

According to a first aspect of the disclosure, an antistatic film structure comprising a transparent antistatic support structure is provided. In some embodiments, the transparent antistatic support structure comprises a polymer selected from the group consisting of native or derivatized cellulose or cellulosic material, polyesters, polyvinyl acetates, polyacrylonitriles, polybutadienes, polystyrenes, polycarbonates, polyacrylates, copolymers and mixtures thereof. The derivatized cellulose may be selected from the group consisting of cellulose alkyl ethers, cellulose hydroxyalkyl ethers, cellulose esters, cellulose functionalized with anionic or cationic functional groups, crosslinked cellulose, and combinations thereof. In a particular embodiment, the transparent antistatic support structure comprises TAC.

In some embodiments, the antistatic film structure further comprises a polarizing element. In a particular embodiment, the polarizing element comprises polyvinyl alcohol (PVA) film.

The transparent antistatic support structure comprises at least one antistatic component. The antistatic component may be selected from the group consisting of graphene, single or multi-wall native or derivatized carbon nanotubes, semiconducting materials, core-shell conductive nanoparticles, organic conductive materials or polymers or co-polymers thereof, organic or inorganic ionic salts or materials, conductive colloids, ionic resins, and mixtures thereof. The inorganic ionic salt or material may comprise vanadium oxide, antimony oxide, tantalum oxide, cerium oxide, tin oxide, titanium oxide, indium oxide, zinc oxide, tin-doped indium oxide, antimony-doped tin oxide, fluorine-doped tin oxide, phosphorus-doped tin oxide, zinc antimonate, indium antimonite, indium-doped zinc oxide, lithium salts, silver, gold, nickel, aluminum, silicon nitride, magnesium fluoride, and combinations thereof. In some aspects, the transparent antistatic support structure comprises a thickness ranging from 50 nm to 2 µm, more preferably from 100 nm to 1.5 µm, even more preferably from 100 nm to 1 µm. In further embodiments, the inorganic ionic material may comprise a metal oxide selected from the group consisting of vanadium oxide, antimony oxide, tin oxide, titanium oxide, indium oxide, silver oxide, gold oxide, aluminum oxide, zinc oxide, lithium oxide, and combinations thereof. The metal oxide may be any known oxide of the corresponding metal. For example, the vanadium oxide inorganic ionic material may be selected from vanadium (II) oxide (VO), vanadium (III) oxide, ($V_2O_3$), vanadium (IV) oxide, ($VO_2$), and vanadium (V) oxide ($V_2O_5$).

In some embodiments, the transparent antistatic support structure is produced by combining a transparent support structure with at least one antistatic component by a process selected from the group consisting of imbibing, melt extruding, blown film extruding, calendaring, solvent casting, mold casting, wet transfer, sublimation, and solidification of a liquid to a solid using heat, UV or other means.

In some embodiments, the antistatic film structure comprises a relative light transmission factor in the visible spectrum, Tv, preferably greater than 85%, more preferably greater than 90%. In some aspects, the antistatic film structure comprises a haze value of less than 1.0%, preferably less than 0.5%.

According to a second aspect of the disclosure, a method for producing an antistatic film structure comprises combining at least one antistatic component with a transparent support structure by a process selected from the group consisting of imbibing, melt extruding, blown film extruding, calendaring, solvent casting, mold casting, wet transfer, sublimation, and solidification of a liquid to a solid using heat, UV or other means. The combining process confers antistatic activity to the transparent support structure. In some embodiments, the transparent support structure comprises a polymer selected from the group consisting of native or derivatized cellulose, polyesters, polyvinyl acetates, polyacrylonitriles, polybutadienes, polystyrenes, polycarbonates, polyacrylates, copolymers and mixtures thereof. In a particular embodiment, the transparent support structure comprises cellulose triacetate.

In some embodiments, the antistatic component comprises at least one component selected from the group consisting of graphene, single or multi-wall native or derivatized carbon nanotubes, semiconducting materials, core-shell conductive nanoparticles, organic conductive materials or polymers or co-polymers thereof, organic or inorganic ionic salts or materials, conductive colloids, ionic resins, and mixtures thereof.

In some embodiments, a method for producing an antistatic film structure further comprises combining a polarizing element with the antistatic film structure. In a particular embodiment, the polarizing element comprises polyvinyl alcohol (PVA) film.

In some aspects, the antistatic film structure may comprise a substrate or coating that enhances the antistatic performance. In some embodiments, an enhancing layer may comprise an additive to enhance antistatic performance. In some aspects, the enhancing layer additive may comprise diethylene glycol, diethylene monoether, diethylene diether, polyethylene, or any combination thereof. In some aspects, the enhancing layer additive is added in an amount ranging from 1-10 wt % of the enhancing layer. In some aspects, the antistatic film structure laminate may comprise a neutral layer that inhibits or prevents negative influence from a laminate layer or substrate.

In some embodiments, the antistatic film structure further comprises one or more abrasion- and/or scratch-resistant layers. The abrasion- and/or scratch-resistant layer is defined as a coating which improves the abrasion- and/or scratch-resistance of the finished film structure as compared to a same film structure without the abrasion- and/or scratch-resistant layer. Any known optical abrasion- and/or scratch-resistant coating composition may be used herein.

Examples of abrasion- and/or scratch-resistant layers are (meth)acrylate based coatings and silicon-containing coatings. (Meth)acrylate based coatings are typically UV-curable. The term (meth)acrylate means either methacrylate or acrylate. The main component of a (meth)acrylate based curable coating composition may be chosen from monofunctional (meth)acrylates and multifunctional (meth)acrylates such as difunctional (meth)acrylates; trifunctional (meth)acrylates; tetrafunctional (meth)acrylates, pentafunctional (meth)acrylates, hexafunctional (meth)acrylates.

Examples of monomers which may be used as main components of (meth)acrylate based coating compositions are:
1) monofunctional (meth)acrylates: allyl methacrylate, 2-ethoxyethyl acrylate, 2-ethoxyethyl methacrylate, caprolactone acrylate, isobornyl methacrylate, lauryl methacrylate, and polypropylene glycol monomethacrylate.
2) difunctional (meth)acrylates: I,4-butanediol diacrylate, I,4-butanediol dimethacrylate, 1,6-hexanediol diacrylate, 1,6-hexanediol dimethacrylate, ethoxylated bisphenol A diacrylate, polyethylene glycol di(meth)acrylates such as polyethylene glycol diacrylate, tetraethylene glycol diacrylate, polyethylene glycol dimethacrylate, polyethylene glycol diacrylate, tetraethylene glycol diacrylate, tripropylene glycol diacrylate, neopentyl glycol diacrylate, tetraethylene glycol dimethacrylate, and diethylene glycol diacrylate.
3) trifunctional (meth)acrylates: trimethylolpropane trimethacrylate, trimethylolpropane triacrylate, pentaerythritol triacrylate, ethoxylated trimethylolpropane triacrylate, and trimethylolpropane trimethacrylate.
tetrafunctional to hexafunctional (meth)acrylates: dipentaerythritol pentaacrylate, pentaerythritol tetraacrylate, ethoxylated pentaerythritol tetraacrylate, and pentaacrylate esters.
4) Silicon-containing abrasion- and/or scratch-resistant coatings are preferably sol-gel coatings, which may be obtained by curing a precursor composition containing silanes or hydrolyzates thereof. The sol-gel silicon based coating compositions which may be used are homogeneous mixtures of a solvent, a silane and/or an organosilane, option ally a surfactant, and optionally a catalyst which are processed to form a coating suitable for optical application.
5) The term "homogeneous" as used herein refers to a form which has a uniform or similar structure throughout and is given the ordinary meaning known to persons skilled in the art. Examples of abrasion- and/or scratch-resistant coatings are epoxytrialkoxysilane-based hard coatings, more preferably γ-glycidoxypropyl-trimethoxysilane-based hard coatings.

The antistatic film structure substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Examples of materials for the lens substrate are polycarbonates and diethylene glycol bis(allyl carbonate) copolymers, in particular substrates made of polycarbonate.

Carbon nanotubes (CNT) contained in the antistatic composition refer to tubular structures grown with a single wall or multi-wall, comprising primarily sp2-hybridized carbon atoms. The carbon nanotubes preferably have a diameter on the order of half nanometer to less than 10 nanometers. Carbon nanotubes can function as either an electrical conductor, similar to a metal, or a semiconductor, according to the orientation of the hexagonal carbon atom lattice relative to the tube axis and the diameter of the tubes.

By "nanoparticles", it is meant particles with a diameter (or longest dimension) less than 1 pm, preferably less than 150 nm and more preferably less than 100 nm.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

There are many methods which can be utilized in order to introduce desired properties, such as antistatic activity, into a polymeric bulk or polymeric substrate. Thermal melt mixing processes include but are not limited to extrusion, calendering, heated mixing heads, 2-roll mills, which melt a polymer and provide shaping, prior to freezing. A melt extrusion process for the preparation of toner particles comprises melt grafting of VTMS onto LPE using a twin screw extruder. Blown film can be compounded and manufactured to comprise desired chemical species such as UV protectorants and coloration for example.

Calendaring is a continuous sheet process where a polymer melt passes through a system of heated rollers, which control the polymer thickness. A polyolefin resin may be mixed with lubricants, plasticizers, and various additives in a mixer followed by roll milling and calendaring to make polyolefin sheet. Upon cooling, the polymer film or sheet is collected on rolls. Extrusion pumps a polymer mass through a die which controls the gross melt dimensions. The exiting melt can be stretched upon its axis to the desired dimensions, during cooling, according to its final use. Polymers such as polyvinyl chloride (PVC) can be dispersed into a plasticizer or a plasticizer and diluent. Heating will melt the PVC, which solidifies or fuses upon cooling.

Films can also be prepared using a batch casting process. In batch casting, glass molds are separated by a rubber gasket and a liquid monomer is injected. The liquid is cured or solidified to make an optical lens. Many times, the liquid resin can contain a tinting agent, a photochromic material, a UV blocking material, an antioxidant, or other desirable materials to achieve the final product and properties. Another method is a casting process typically involving some reactive liquid materials with the solidification of these liquids to a solid using heat, UV or other suitable means. Plastisol and organosol casting processes involve the swelling of the polymer in a plasticizer matrix, after which the solvent action of the plasticizer forms a film.

Yet another method of casting is where some polymeric solid is liquefied by dissolving into a suitable solvent or mixture of solvents, also known as dope. Many time additives are also included in the the dope such as plasticizers or fillers. For example, in the manufacturing of a cellulose triacetate film (TAC), a dope is prepared of TAC dissolved in some solvent such as ketone or ester for example. The dope is cast onto some moving belt flat surface where the solvent is allowed to evaporate leaving behind a polymeric film that is peeled away. The film can be transported over rollers for additional drying or conditioning. The dope can also contain a plasticizer such as esters or phthalates or other molecules which will reduce softening temperature to improve flexibility and processability or moldability.

The antistatic film structures described herein comprise a transparent antistatic support structure which comprises at least one antistatic component. The transparent antistatic support structure is combined with an antistatic component by a process selected from the group consisting of imbibing, melt extruding, blown film extruding, calendaring, solvent casting, mold casting, wet transfer, sublimation, and solidification of a liquid to a solid using heat, UV or other means. The processes for combining an antistatic component with a support structure are described in further detail below. The methods described herein may be applied to polymers other than the specific polymers described below, including but not limited to native or derivatized cellulose or cellulosic material, polyesters, polyvinyl acetates, polyacrylonitriles, polybutadienes, polystyrenes, polycarbonates, polyacrylates, copolymers and mixtures thereof.

EXAMPLE 1

Antistatic Components Incorporated in Film During Manufacturing

In some embodiments, antistatic components are incorporated in a transparent antistatic support structure during manufacturing. There are many methods which can be utilized in order to introduce desired properties or features into a polymeric bulk or polymeric substrate, including extrusion, calendaring, and casting.

EXAMPLE 1.1

Antistatic Components in Solubilizer

An antistatic component may be added to a pre-production film composition in conjunction with a solubilizer. A solution comprising a solvent, a cellulosic polymer, a solubilizing agent and an antistatic component is prepared. The solubilizing agent can be a plasticizer or other material that dissolves or compatibilizes the antistatic component into the polymer matrix. The solubilizing agent minimizes haze or incompatibility of the antistatic component in the cellulosic polymer in order to provide maximum transmission. Attention to refractive index matching may provide additional benefits.

EXAMPLE 1.2

Antistatic Monomer/Oligomer/Prepolymer Solution Polymerization

An antistatic monomer, oligomer, or prepolymer may be grafted to a polymer to create a block copolymer, which may then be fashioned into a film. A solution comprising a solvent, a cellulosic polymer, an antistatic monomer, and an initiator is prepared. The initiator may be a thermal or UV initiator. In some embodiments, the initiator is a UV initiator. The antistatic monomer is polymerized in solution to a pre-determined molecular weight. The oligomeric or polymeric antistatic component may then be grafted onto the cellulose polymer. The graft polymerization method provides minimize haze and maximum light transmission.

EXAMPLE 1.3

Reactive Antistatic Component Trans-Esterification

An antistatic component may be selected to react chemically with a film polymer. The trans-esterification of a triacetate cellulose ester may be accomplished by reaction with an alcoholic antistatic species or other suitable antistatic species. Trans-esterification is typically conducted in an acidic medium with a large excess of the alcoholic species. By chemically ligating the antistatic species onto TAC, haze is minimized and maximum light transmission is provided. The trans-esterification is ideally performed during the manufacturing of the TAC resin conducted in acidic media. Trans-esterification may optionally be performed during the preparation of the dope solution in conjunction with a high boiling point solvent.

EXAMPLE 1.4

Antistatic Monomer in Solid State Polymerization

A solution comprising a solvent, a cellulosic polymer, an antistatic monomer, and an initiator is prepared. The initiator can be thermal or UV cured. The formulation is deposited onto a continuous belt where the solvent is evaporated to make a film. The antistatic monomer is graft-polymerized onto the cellulosic polymer by UV exposure. Grafting the antistatic monomer onto the cellulosic polymer minimizes haze and provide maximum light transmission.

EXAMPLE 1.5

CNT Modified Thermoplastic Film

CNTs may be chemically modified then added to a cellulosic polymer, which is then fashioned into a film. The surface of CNT antistatic species may be modified by a silane material by a number of different methods known to those of skill in the art. In an exemplary process, silane modification is achieved by first treating the CNTs with UV light within an ozone chamber. The oxidized CNTs are then reduced by addition of lithium aluminum hydride. Silanation is then accomplished using an epoxysilane such as 3-glycidoxypropyltrimethoxy silane. The modified CNT is added to a cellulosic polymer dope solution. Upon formation of the cellulosic film, the surface modified CNT becomes incorporated into the cellulosic polymer.

EXAMPLE 1.6

Antistatic Polymer Compatible with Thermoplastic Film

An antistatic polymer may be mixed with a thermoplastic polymer in solution to produce a film that comprises both the thermoplastic polymer and the antistatic polymer. A solution comprising a solvent, a cellulosic polymer, and an antistatic polymer (e.g. polyethylene dioxythiophene doped with polystyrene sulfonate) is prepared. The resulting polymer blend layer may then be fashioned into an antistatic cellulosic film by a casting process, for example.

EXAMPLE 2

Antistatic Components Inside Thermoplastic Film, Post "Thermoplastic Film Manufacturing"

In some embodiments, antistatic components are incorporated in a transparent antistatic support structure during manufacturing by imbibition, infusion, or diffusion processes. Antistatic molecules including but not limited to inorganic ionic salts, organic ionic materials, conductive polymers, conductive colloids, antistatic polymers, ionic resins, CNT and graphenes may be embedded into films using these methods.

Imbibing is a method for introducing molecules that bestow desired properties into a bulk solid. In one method, molecule(s) are mixed into an inert transfer material which is then applied onto a receiving or host material at some pre-determined layer thickness. The host is then heated in an oven for example, to dry or evaporate any solvents and diffuse molecules into a host material from a transfer layer that is subsequently removed. The transfer layer thickness, molecule(s) concentration, oven temperature, oven time, molecule molecular weight and solubility in the host material will have an effect on molecule(s) transfer efficiency.

In some embodiments, the antistatic component is contained in a temporary transfer medium that is applied onto the TAC. Heating the TAC caused the TAC to absorb the antistatic component into the TAC surface. Concentration and depth of penetration are controlled by the binder layer concentration, imbibing time and temperature.

EXAMPLE 2.1

Antistatic Solution

A binder solution is made comprising a binder, a solvent and an antistatic component. The solution is then deposited onto a polymer substrate film and dried. After drying, the remaining binder layer is heated which transfers the antistatic component into the substrate film. The binder is washed off or removed, resulting in a polymer film layer with antistatic properties.

EXAMPLE 2.2

Antistatic Paste

A binder paste comprising a binder, a liquid, and an antistatic component is prepared. The binder paste is deposited onto a polymer substrate film. After drying, the remaining binder layer is heated which transfers the antistatic component into the substrate film. The binder is washed off or removed, resulting in a polymer film layer with antistatic properties.

EXAMPLE 2.3

Antistatic Gel

A binder solution comprising a gel binder, a liquid, and an antistatic component is prepared. The binder solution is deposited onto a polymer substrate film. After drying, the remaining gel layer is heated which transfers the antistatic component into the substrate film. The gel is washed off or removed, resulting in a polymer film layer with antistatic properties.

EXAMPLE 2.4

Antistatic Solid

A binder solution, paste, or gel is made by one of the processes described in examples 2.1-2.3. The solution, paste or gel is applied onto a transfer medium and dried. The antistatic component is transferred from the medium to a lens surface in a chamber, for example, in a Nidek patternless edger. Antistatic component imbibition into the lens surface occurs during the post-curing process.

EXAMPLE 2.5

Antistatic Solid (Electrostatic)

A solid antistatic layer may deposited onto a substrate through electrostatic means, e.g., electrostatic spray painting. Antistatic component may be sprayed with an electrostatic spray gun which applies a positive charge to the atomized antistatic component as it leaves the spray gun. The charged antistatic component is then sprayed through a strong electric field which is a term used to describe patterns of forces. The substrate is grounded, which then attracts the positively charged antistatic component to the substrate surface very much like a magnet. The coated substrate may then be heated, during which the antistatic component is imbibed or absorbed into the substrate.

The claims are not to be interpreted as including means-plus- or step-plus-function limitations, unless such a limitation is explicitly recited in a given claim using the phrase(s) "means for" or "step for," respectively.

The claims are not to be interpreted as including means-plus- or step-plus-function limitations, unless such a limitation is explicitly recited in a given claim using the phrase(s) "means for" or "step for," respectively.

The invention claimed is:

1. An optical article comprising a substrate and an antistatic film structure deposited onto said substrate that comprises a transparent antistatic support structure comprising at least one antistatic component, wherein the transparent antistatic support structure comprises cellulose triacetate, and
wherein the antistatic film structure is coated with an enhancing layer comprising at least one enhancing additive selected from the group consisting of diethylene glycol, diethylene monoether glycol, diethylene diether glycol, polyethylene glycol, and any combination thereof and wherein the enhancing layer additive is added in an amount ranging from 1 to 10 wt % of the enhancing layer.

2. The optical article of claim 1, wherein the transparent antistatic support structure further comprises at least one antistatic component selected from the group consisting of graphene, single or multi-wall native or derivatized carbon nanotubes, semiconducting materials, core-shell conductive nanoparticles, organic conductive materials or polymers or co-polymers thereof, organic or inorganic ionic salts or materials, conductive colloids, ionic resins, and mixtures thereof.

3. The optical article of claim 1, wherein the transparent antistatic support structure is produced by combining a transparent support structure with at least one antistatic component by imbibing, melt extruding, blown film extruding, calendaring, solvent casting, mold casting, wet transfer, sublimation, or solidification of a liquid to a solid using heat, UV or other means.

4. The optical article of claim 1, wherein the antistatic film structure further comprises a polarizing element.

5. The optical article of claim 4, wherein the polarizing element of said antistatic film structure comprises polyvinyl alcohol (PVA) film.

6. The optical article of claim 2, wherein the inorganic ionic salt or material comprises vanadium oxide, antimony oxide, tantalum oxide, cerium oxide, tin oxide, titanium oxide, indium oxide, zinc oxide, tin-doped indium oxide, antimony-doped tin oxide, fluorine-doped tin oxide, phosphorus-doped tin oxide, zinc antimonate, indium antimonite, indium-doped zinc oxide, lithium salts, silver, gold, nickel, aluminum, silicon nitride, magnesium fluoride, or a combination thereof.

7. The optical article of claim 1, comprising a relative light transmission factor in the visible spectrum, Tv, that is greater than 85%.

8. The optical article of claim 7, comprising a relative light transmission factor in the visible spectrum, Tv, that is greater than 90%.

9. The optical article of claim 1, wherein the transparent antistatic support structure comprises a thickness ranging from 50 nm to 2 μm.

10. The optical article of claim 9, wherein the transparent antistatic support structure comprises a thickness ranging from 100 nm to 1.5 μm.

11. The optical article of claim 9, wherein the transparent antistatic support structure comprises a thickness ranging from 100 nm to 1 μm.

12. The optical article of claim 1, comprising a haze value of less than 1.0%.

13. The optical article of claim 12, comprising a haze value of less than 0.5%.

14. A method for producing an antistatic film structure of an optical article comprising combining at least one antistatic component with a transparent support structure to give a transparent antistatic support structure comprising at least one antistatic component, wherein the antistatic film structure comprises an enhancing layer comprising at least one enhancing additive selected from the group consisting of diethylene glycol, diethylene monoether glycol, diethylene diether glycol, polyethylene glycol, and any combination thereof and wherein the enhancing layer additive is added in an amount ranging from 1 to 10 wt % of the enhancing layer, and wherein the at least one antistatic component and transparent support structure are combined by a process comprising imbibing, melt extruding, blown film extruding, calendaring, solvent casting, mold casting, wet transfer, sublimation, or solidification of a liquid to a solid using heat, UV, or other means.

15. The method of claim 14, wherein the at least one antistatic component comprises at least one component selected from the group consisting of graphene, single or multi-wall native or derivatized carbon nanotubes, semiconducting materials, core-shell conductive nanoparticles, organic conductive materials or polymers or co-polymers thereof, organic or inorganic ionic salts or materials, conductive colloids, ionic resins, and mixtures thereof.

16. The method of claim 14, wherein the transparent support structure comprises a polymer selected from the group consisting of native or derivatized cellulose, polyesters, polyvinyl acetates, polyacrylonitriles, polybutadienes, polystyrenes, polycarbonates, polyacrylates, copolymers and mixtures thereof.

17. The method of claim 16, wherein the transparent support structure comprises cellulose triacetate.

18. The method of claim 14, wherein the method further comprises combining a polarizing element with the antistatic film structure.

19. The method of claim 18, wherein the polarizing element comprises polyvinyl alcohol (PVA) film.

* * * * *